US006222467B1

United States Patent
Moon

(10) Patent No.: US 6,222,467 B1
(45) Date of Patent: Apr. 24, 2001

(54) BITSTREAM DECODING APPARATUS

(75) Inventor: Dong-young Moon, Seoul (KR)

(73) Assignee: Samsung Electronics Co., Ltd., Kyungki-Do (JP)

( * ) Notice: Subject to any disclaimer, the term of this patent is extended or adjusted under 35 U.S.C. 154(b) by 0 days.

(21) Appl. No.: 09/534,205

(22) Filed: Mar. 24, 2000

(30) Foreign Application Priority Data

Mar. 24, 1999 (KR) .................................................. 99-10061

(51) Int. Cl.[7] .................................................. H03M 7/00
(52) U.S. Cl. .............................. 341/82; 341/67; 341/106
(58) Field of Search .................................. 341/63, 106, 67, 341/65; 382/245, 233, 250, 82

(56) References Cited

U.S. PATENT DOCUMENTS 5,642,115 * 6/1997 Chen ...................................... 341/106
5,956,429 * 9/1999 Burns ...................................... 341/63
5,990,812 * 11/1999 Bakhmutsky ........................ 341/106

* cited by examiner

Primary Examiner—Peguy JeanPierre
Assistant Examiner—Jean B Jeanglaude
(74) Attorney, Agent, or Firm—Sughrue, Mion, Zinn, Macpeak & Seas, PLLC

(57) ABSTRACT

A bitstream decoding apparatus for decoding a video signal compressed according to the Moving Picture Experts Group (MPEG) standard within a single clock cycle to convert the compressed video signal into the form of symbols such as video parameters and discrete cosine transform (DCT) coefficients. The bitstream decoding apparatus for performing the decoding operation within a single clock cycle includes a shifter, a variable length decoder, a fixed length decoder, a zero-run & AC decoder, a first multiplexer, a second multiplexer, and a first comparator. In the bitstream decoding apparatus, the compressed video data can be decoded within a single clock cycle to perform transmission of a high-resolution picture signal such as that used in a digital television in an efficient way.

4 Claims, 2 Drawing Sheets

BITSTREAM DECODING APPARATUS

BACKGROUND OF THE INVENTION

1. Field of the Invention

The present invention relates to an apparatus for processing a video signal, and more particularly, to a bitstream decoding apparatus which decodes a video signal compressed according to the Moving Picture Experts Group (MPEG) standard within one clock cycle and converts the compressed video signal into the form of symbols such as video parameters and discrete cosine transform (DCT) coefficients. The present application is based on Korean Patent Application No. 99-10061 which is incorporated herein by reference.

2. Description of the Related Art

Video bitstreams compressed and encoded under the MPEG1 and MPEG2 standards include a fixed length code, a variable length code, and variable length codes of zero run-length and an AC coefficient pair. In a video decoding apparatus, in order to decode the three types of codes mentioned above from a bitstream into processible form, the bitstream undergoes a process of bitstream decoding at an initial step of decoding. The operating speed of the bitstream decoder is mainly determined by how fast it decodes the run-length codes which account for most of the video data. Recently, development of digital television including high-definition television (HDTV) requires transmission of a considerably high-resolution picture, for example, a resolution of 1920×1080 pixels per picture.

To speed up the decoding of a video decoding apparatus, it is necessary to increase the speed of the bitstream decoder as well as of the operating clock frequency. However, a conventional bitstream decoder has problems in transmitting a high-resolution picture signal since it takes a long time to decode a fixed length code, a variable length code, and variable length codes of zero run-length and an AC coefficient pair.

SUMMARY OF THE INVENTION

To solve the above problem, it is an objective of the present invention to provide a video bitstream decoding apparatus capable of decoding a fixed length code, a variable length code, and a variable length code of zero run-length and an AC coefficient pair within a single clock cycle in response to transmission of a high-resolution picture signal such as that used in a digital televisions.

Accordingly, to achieve the above objective, there is provided a bitstream decoding apparatus for performing the decoding operation within a single clock cycle which has a bitstream decoder for decoding a bitstream input from a storing unit, a control logic for monitoring the bitstream decoding, and a video processor for converting the decoded bitstream into displayable pixel values. In the bitstream decoding apparatus, the bitstream decoder includes a shifter for shifting the bitstream according to the input of a bitstream to be shifted, a variable length decoder for decoding the output from the shifter into symbol and code by referring to a code book, a fixed length decoder for extracting bits from the most significant bit of a symbol to the extent prescribed by the control logic based on the output of the shifter to position the extracted bits onto the least significant bit of the symbol, a zero-run & AC decoder for receiving the outputs of the shifter and the variable length decoder as an input and, if an escape code exists, to calculate the zero run and AC coefficient, otherwise to calculate an AC coefficient using a zero run and AC level decoded by the variable length decoder, a first multiplexer for selecting the outputs from the variable length decoder, the fixed length decoder and the zero-run & AC decoder according to the control of the control logic, a second multiplexer for selecting a bitstream (number of bits) to be shifted among a variable length bitstream from the variable length decoder, a fixed length bitstream from the control logic, or a 24-bit bitstream if an escape code of AC exists, and a first comparator for comparing the bitstream selected by the second multiplexer with a predetermined bitstream to generate a signal for reading the storing unit.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENTS

Figure 1:
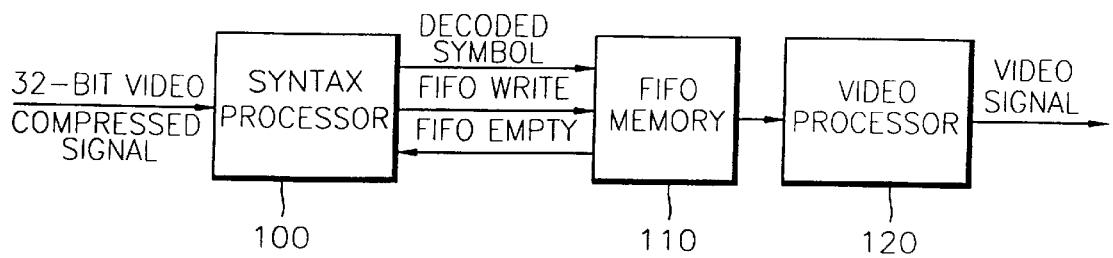
FIG. 1 is a block diagram showing the configuration of a general MPEG decoding apparatus.

Referring to FIG. 1, which shows the configuration of a general MPEG decoding apparatus, the apparatus shown in FIG. 1 includes a syntax processor 100 which converts a bitstream input from a buffer (not shown) into symbols such as video parameters and Discrete Cosine Transform (DCT) coefficients according to the MPEG scheme or other algorithms, a symbol first-in first-out memory 110 (hereinafter referred to as "FIFO memory") which interfaces a symbol form of the bitstream converted in the syntax processor 100, and a video processor 120 which performs a motion compensation operation and inverse discrete cosine transformation and converts the bitstream output from the FIFO memory 110 into displayable pixel data.

Figure 2:
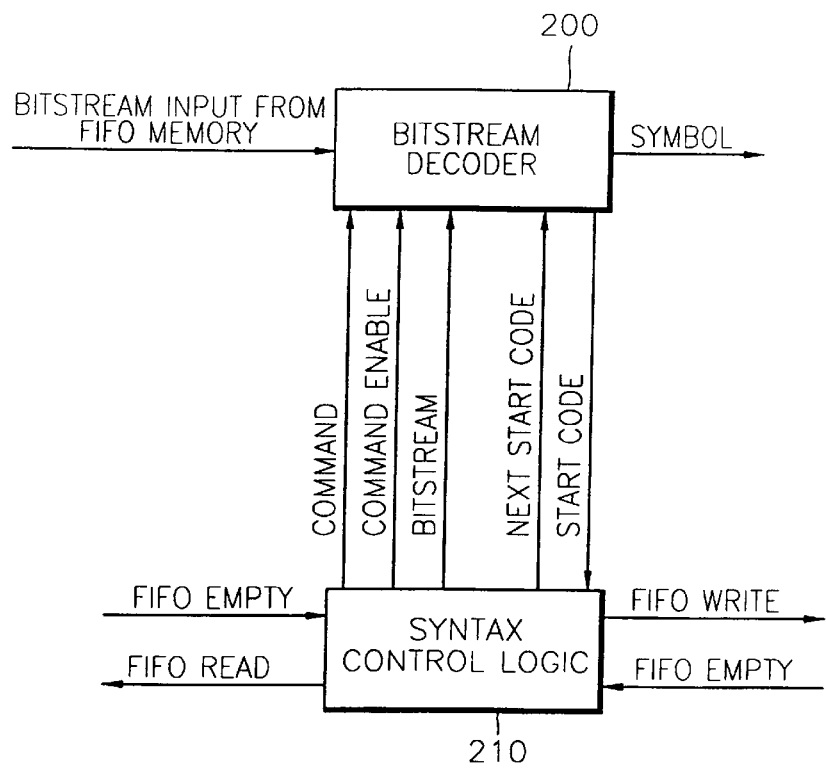
FIG. 2 is a detailed diagram of a syntax processor in the apparatus shown in FIG. 1.

FIG. 2 is a detailed diagram of the syntax processor 100 shown in FIG. 1. The apparatus shown in FIG. 2 has a bitstream decoder 200 for decoding a video bitstream input from the FIFO memory 110 and a syntax control logic 210 for monitoring the decoding of the bitstream decoder 200 according to a prescribed order under the MPEG standard or other algorithms.

Figure 3:
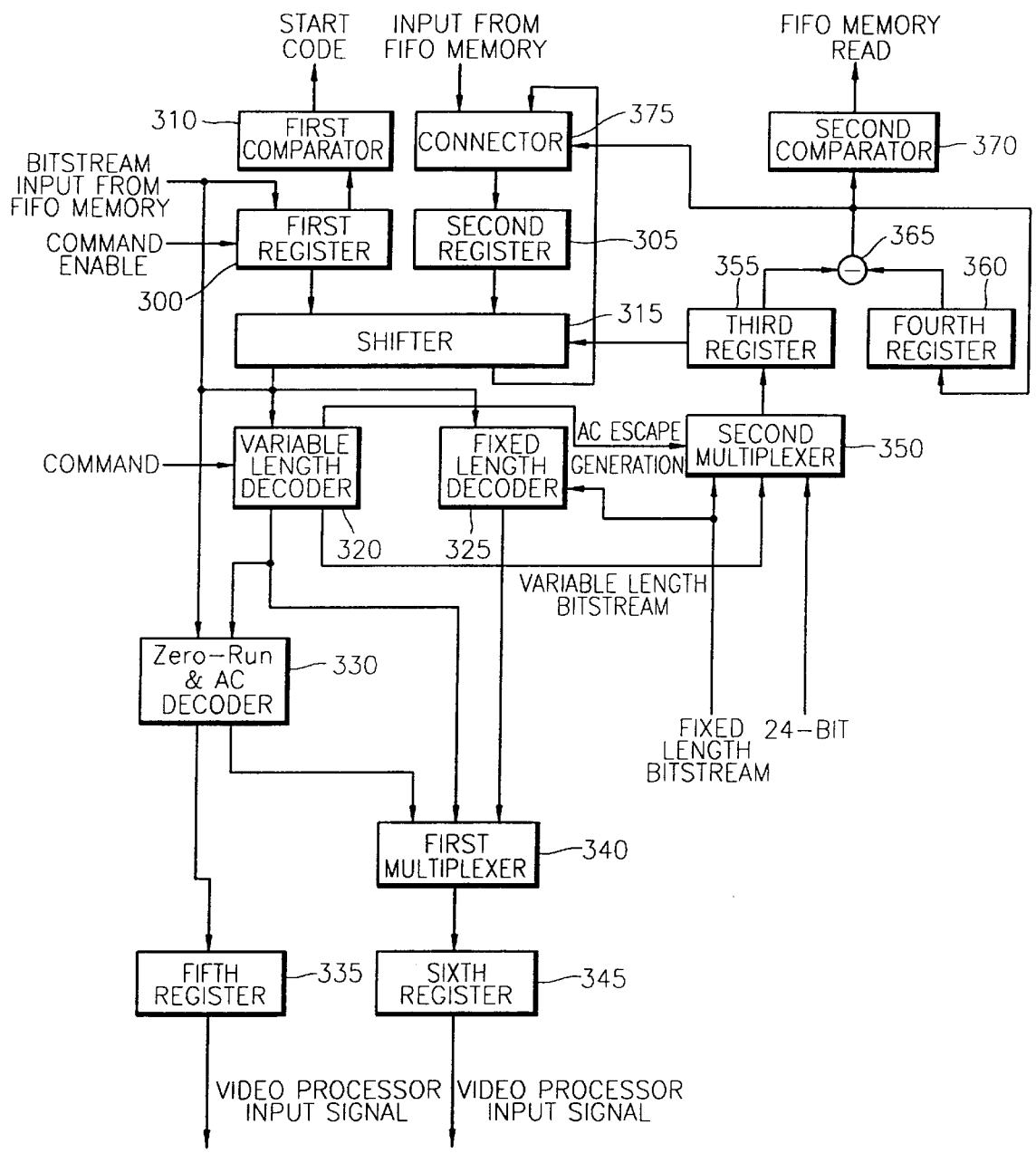
FIG. 3 is a block diagram showing the configuration of a video bitstream decoding apparatus according to the present invention.

FIG. 3 is a block diagram showing the configuration of a bitstream decoding apparatus according to the present invention. The apparatus shown in FIG. 3 includes a first register 300 for storing a bitstream input from the FIFO memory 110, a second register 305, a first comparator 310 for comparing data stored in the first register 300 to output a decoding start code, a shifter 315 for shifting bitstreams stored in the first register 300 and the second register 305 according to the input of a bitstream to be shifted, a variable length decoder 320 for outputting symbol and code corresponding to the bitstream input from the shifter 315 by referring to a code book, a fixed length decoder 325 for extracting bits from the most significant bit (MSB) of a symbol to the extent prescribed by the syntax control logic 210 to position the extracted bits onto the least significant bit (LSB) of the symbol, a zero-run & AC decoder 330 for receiving the output of the variable length decoder 320 and 24-bit bitstream as an input and, if an escape code exists, to directly calculate the zero-run and AC coefficient from the bitstream input, otherwise to calculate an AC coefficient using zero-run and AC level decoded by the variable length decoder 320, a fifth register 335 for storing zero run-length among outputs from the zero-run & AC decoder 330, a first multiplexer 340 for selecting the outputs of the variable length decoder 320, the fixed length decoder 325 and the zero-run & AC decoder 330 according to the order of input from the syntax control logic 210, a sixth register 345 for storing the symbol output from the first multiplexer 340, a second multiplexer 350 for selecting and outputting a bitstream among a variable length bitstream output from the variable length decoder 320, a fixed length bitstream output from the syntax control logic 210, or a 24-bit bitstream which is the largest shift bit number if an escape code of AC exists, a third register 355 for storing a bitstream output from the second multiplexer 350 and inputting a bitstream to be shifted into the shifter 315, a fourth register 360 for storing the effective bits remaining in the second register 305, a subtracter 365 for subtracting the bitstream of the third register 355 and the effective bits of the fourth register 360, a second comparator 370 for generating a read signal to send to the FIFO memory 110 if the bit output from the subtracter 365 is less than or equal to 23 bits, and a connector 375 for connecting the effective bits remaining in the second register 305 according to the output of the subtracter 365 with a bitstream input from the FIFO memory 110.

Referring to FIGS. 1 through 3, a decoding process will be described in detail.

According to the MPEG standard or other algorithms, the syntax processor 100 converts a video bitstream into the form of video parameters and DCT coefficients to transmit the converted forms to the video processor 120 through the FIFO memory 110. The syntax processor 100 performs the decoding of header and video information input from the buffer (not shown) according to syntax. The FIFO memory 110 serves to interface the speed difference between the syntax processor 100 and the video processor 120. The video processor 120 performs motion compensation and inverse discrete transformation to convert the operation mode information such as video parameters and DCT coefficients, motion vector, DC coefficient, zero-run and AC coefficient transmitted from the syntax processor 100 into displayable pixel values.

The syntax processor 100 is mainly comprised of the bitstream decoder 200 and the syntax control logic 210. The bitstream decoder 200 decodes the header and video information input from the buffer. The syntax control logic 210 controls the decoding performance according to the MPEG standard or other predetermined algorithms to give the bitstream decoder 200 a command which designates the type of symbol to be decoded and a command enable signal and to designate a bitstream in extracting a fixed length code. All registers in the bitstream decoder 200 are latched by the command enable signal, and all multiplexers therein are selected by the command.

Referring to FIG. 3 showing the particulars of the bitstream decoder 200, there is a module for decoding a variable length code on this position by which variable length encoded symbols are converted. In this case, if an escape code exists in the run length code, three variable length codes including an escape code, zero run length, and an AC coefficient must be decoded, which conventionally requires at least three clock cycles even if each variable length code can be decoded during one cycle. The present invention, even in this case, allows decoding within one clock cycle.

A 32-bit bitstream is input from the FIFO memory 110. The incoming bitstream is stored in the second register 305 which is a bitstream register. 24-bits and 55-bits are stored respectively in the first and second registers 300 and 305. A total of 79-bits are input into the shifter 315, and the twenty-four MSBs of the output from the shifter 315 are input into the respective decoding logic such as the variable length decoder 320, the fixed length decoder 325, and the zero-run & AC decoder 330. The respective outputs from the above decoding logic are stored in the sixth register 345 selected by the first multiplexer 340 according to the order of input from the syntax control logic 210. The symbol stored in the sixth register 345 is transmitted to the FIFO memory 110 by the syntax control logic 210, which is utilized as an input of the video processor 120.

The shifter 315 can shift a maximum of 24 bits. The reason is that if a code which is not prescribed in the code book appears in a zero run & AC code, a total of 24 bits including a 6-bit escape code, a 6-bit zero-run, and a 12-bit AC coefficient must be decoded simultaneously for the zero-run & AC codes to be decoded each clock cycle.

The bitstream to be shifted in the shifter 315 are stored in the third register 355 which is a bitstream register while the effective bits remaining in the second register are stored in the fourth register 360 which is a leftover register. The subtracter 365 subtracts the number of bits to be shifted stored in the third register 355 and the number of effective bits stored in the fourth register 360. The very result of the subtracter 365 is the number of effective bits remaining in the second register 305 in the next cycle.

The second comparator 370 generates a read signal to send to the FIFO memory 110 by comparing the result of the subtracter 365 in the event that the result of the subtracter 365, i.e., the number of effective bits remaining in the second register 305, is determined to be less than or equal to 23 bits through the second comparator 370. When the read signal is sent to the FIFO memory 110, the connector 375 connects a waiting 32-bit bitstream and the remaining effective bits in the second register 305 to provide the corresponding bits for the second register 305 as an input for the next cycle. In this case, the value adding 32 bits to the effective bits for use in the next cycle is stored in the fourth register 360. On the other hand, in the event that the result of the subtracter 365, i.e., the number of effective bits remaining in the second register 305 is determined to be greater than 23 bits through the second comparator 370, the fifty-five LSBs of the output from the shifter 315 are input to the second register 305, and the effective bits for the next cycle are input to the fourth register 360.

The first comparator 310 generates a start code signaling the start of header information by sensing 0×000001 among bits stored in the first register 300.

The second multiplexer 350 selects a bitstream from a variable length bitstream in the case of a variable length code, a fixed length bitstream input from the syntax control logic 210 in the case of a fixed length code, or a 24-bit bitstream if an escape code exists, and outputs the decoded bitstream to be stored in the third register 355.

The variable length decoder 320 outputs the lengths of the symbol and code corresponding to the input bitstream, referring to the code book. The fixed length decoder 325 extracts bits from the MSB to the extent prescribed by the syntax control logic 210 and positions the bits onto the LSB of a symbol. The zero-run & AC decoder 330 receives a 24-bit bitstream and the output of the variable length decoder 320 as an input to calculate zero-run and AC coefficient directly from the bitstream input in the event that an escape code exists or to calculate AC coefficient using a zero-run and AC level decoded by the variable length decoder 320 in the event that an escape code does not exist. Thereafter, the zero-run is stored in the fifth register 335 and the AC coefficient is stored in the sixth register 345, in which case the AC coefficient output from the sixth register 345 is a 12-bit signed integer calculated from the AC level. The variable length decoder 320, the fixed length decoder 325, and the zero-run & AC decoder 330 are arranged in parallel, and outputs from the variable length decoder 320, the fixed length decoder 325, and the zero-run & AC decoder 330 are selected at the first multiplexer 340 according to the order of the syntax control logic 210.

In the above-described manner, the video processor receives inputs of the header information, motion vector, DC coefficient, run-length and AC coefficient in order, which are employed to reproduce a video signal.

The present invention is not limited to the above embodiment, and thus various changes in form and details by those skilled in the art may be made within a spirit of the invention.

As stated in the foregoing, according to the present invention, compressed video data can be decoded within a single clock cycle to efficiently perform transmission of a high-resolution picture signal such as that used in a digital television.

What is claimed is:

1. A bitstream decoding apparatus for performing a decoding operation within a single clock cycle which includes a bitstream decoder for decoding a bitstream input from a storing unit, a control logic for controlling the function of the bitstream decoder, and a video processor for converting the decoded bitstream into displayable pixel values, wherein the bitstream decoder comprises:

a shifter for shifting a prescribed bitstream according to an input of a bitstream to be shifted, and for providing a shifted output;

a variable length decoder for decoding the shifted output from the shifter into symbol and code referring to a code book to provide variable length decoded output;

a fixed length decoder for extracting bits from the most significant bits of a symbol, to the extent prescribed by the control logic, from the output of the shifter to position the extracted bits as the least significant bits of the symbol;

a zero-run & AC decoder for receiving the shifted output of the shifter and the variable length decoded output of the variable length decoder as an input to calculate zero-run and AC coefficient in the event that an escape code exists and to calculate AC coefficient using zero-run and AC level decoded by the variable length decoder in the event that an escape code does not exist and to provide an output;

a first multiplexer for selecting the outputs from the variable length decoder, the fixed length decoder, and the zero-run & AC decoder according to the control of the control logic;

a second multiplexer for selecting a bitstream to be shifted among a variable length bitstream input from the variable length decoder, a fixed length bitstream input from the control logic, and a 24-bit bitstream if an escape code of AC exists; and a first comparator for comparing the bitstream to be shifted selected from the second multiplexer with a predetermined bitstream to generate a read signal for application to the storing unit.

2. The bitstream decoding apparatus according to claim 1, wherein the bitstream decoder further comprises a connector for connecting a predetermined number of bits stored in the storing unit with the predetermined bitstream to provide the corresponding bits as the input of the shifter when the read signal is applied to the storing unit.

3. The bitstream decoding apparatus according to claim 1, wherein the bitstream decoder further comprises a second comparator which outputs a decoding start code so as to initiate the decoding detects when the second comparator detects that bits stored in the storing unit are 0×000001.

4. The bitstream decoding apparatus according to claim 1, wherein the variable length decoder, the fixed length decoder, and the zero-run & AC decoder are aligned in parallel and the outputs from the variable length decoder, the fixed length decoder, and the zero-run & AC decoder are selected according to the control of the control logic.

* * * * *